(12) United States Patent
Shimizu

(10) Patent No.: US 7,769,243 B2
(45) Date of Patent: Aug. 3, 2010

(54) METHOD AND APPARATUS FOR IMAGE INSPECTION

(75) Inventor: Isao Shimizu, Ibaraki (JP)

(73) Assignee: Japan Science and Technology Agency, Saitama (JP)

(*) Notice: Subject to any disclaimer, the term of this patent is extended or adjusted under 35 U.S.C. 154(b) by 943 days.

(21) Appl. No.: 11/587,559

(22) PCT Filed: Apr. 19, 2005

(86) PCT No.: PCT/JP2005/007468

§ 371 (c)(1),
(2), (4) Date: Oct. 25, 2006

(87) PCT Pub. No.: WO2005/106437

PCT Pub. Date: Nov. 10, 2005

(65) Prior Publication Data

US 2007/0230819 A1 Oct. 4, 2007

(30) Foreign Application Priority Data

Apr. 27, 2004 (JP) .............................. 2004-130734

(51) Int. Cl.
*G06K 9/40* (2006.01)
(52) U.S. Cl. ...................................... 382/275; 382/112
(58) Field of Classification Search ................ 382/112; 250/492.22; 359/561
See application file for complete search history.

(56) References Cited

U.S. PATENT DOCUMENTS 6,690,469 B1 2/2004 Shibata et al.
2004/0099819 A1* 5/2004 Yamaguchi et al. .... 250/492.22

FOREIGN PATENT DOCUMENTS

JP 02-277177 A 11/1990

(Continued)

OTHER PUBLICATIONS

Hideyuki Tamura; "Computer Image Processing," pp. 146-149, Soken Shuppan (Jan. 1990).

(Continued)

*Primary Examiner*—Vu Le
*Assistant Examiner*—Amara Abdi
(74) *Attorney, Agent, or Firm*—Rader, Fishman & Grauer PLLC

(57) ABSTRACT

An image checking process wherein only a defective or differential portion of a checked image is displayed together with its position and wherein no pre-processing is required for image positioning. A computer (3) captures a reference image or Fourier transformed image thereof from a storage part, a CCD camera (1) or a CCD camera (2) to acquire intensity information and phase information, and also captures an identified image or Fourier transformed image thereof from the storage part, CCD camera (1) or CCD camera (2) to acquire intensity information of the Fourier transformed image of the identified image. Then, the computer (3) determines the difference in intensity information between the reference image and the Fourier transformed image of the identified image and further determines an inverse Fourier transformed image of an expression obtained from the determined differential intensity information and the phase information of the reference image to output the inverse Fourier transformed image to an output part or display part. The inverse Fourier transformed image is used to extract, as a difference between the identified image and the reference image, an image defect of the identified image or the image difference between the identified image and the reference image.

23 Claims, 13 Drawing Sheets

FOREIGN PATENT DOCUMENTS

| | | |
|---|---|---|
| JP | 2000-105203 A | 4/2000 |
| JP | 2000-155099 A | 6/2000 |
| JP | 2000-215803 A | 8/2000 |
| JP | 2002-243426 A | 8/2002 |
| JP | 2003-123073 A | 4/2003 |

OTHER PUBLICATIONS

S. Kawata et al.; "Image Data Processing for a Science Measurement pp. 126-131," CQ Publishing Co., Ltd. (Apr. 1994).

J. Toriwaki et al.; Digital Image for Image understanding, pp. 10-13, Shokodo Co., Ltd. (Feb. 1988).

Nobuyuki Akiyama; Foreign substance inspection technology, O plus E, vol. 23, No. 5, pp. 558-563, (May 2001).

"Image Processing Application System," pp. 145-147, The Japan Society for Precision Engineering; Tokyo Denki University Press (Jul. 2000).

* cited by examiner

METHOD AND APPARATUS FOR IMAGE INSPECTION

BACKGROUND OF THE INVENTION

1. Technical Field

The present invention relates to a method and an apparatus for image inspection, and particularly to a method and an apparatus for image inspection for quickly performing a check of a minute defect or foreign matter on an identified image (an image to be identified, an image to be inspected, an image to be checked), a comparison, collation and check between the identified image and a reference image, or the like.

2. Background Art

As conventional digital image processing methods of image defect extraction, following methods are enumerated.

(1) A method of performing the convolution of Fourier transformed (FFT) images of a reference image and a checked image and the inverse Fourier transform (FFT) thereof for a check of a defective image of a minute lack, projection or the like in a conventional digital image processing method (see non-patent document 1 with respect to a position correcting method, and see non-patent document 2 with respect to a calculation time).

(2) In a conventional digital image processing method, in order to identify a very minute defect in a large size image, a comparison is made in an image recorded on pixels of an electronic camera (see non-patent document 3).

In addition, as the related art, there are a Fourier transformed image comparison method (see non-patent document 4) as an optical analog identification method, and a large visual field acquisition method of a sharpened image (see non-patent document 5).

Besides, conventionally, there is a method in which a check image signal and a reference image signal are Fourier transformed, and a complex conjugate of phase components of the Fourier transform of the checked image signal and the reference image signal is multiplied to obtain a combined image signal, and further, the obtained combined image signal is inverse Fourier transformed, so that a defect of a shadow mask is detected (see patent document 1).

Patent document 1: JP-A-2000-215803

Non-patent document 1: edited by Hideyuki Tamura, "Computer Image Processing: Application Practice Part 1" Souken Shuppan, p 147

Non-patent document 2: edited and written by Satoshi Kawada, Shigeo Minami, "Image Data Processing for Scientific Measurement" CQ Publishing Co., Ltd., p 126

Non-patent document 3: written by Junichiro Toriwaki, edited by Shigeo Tsujii, "Digital Image Processing for Image Comprehension [1]" Shokodo Co., Ltd., p 12

Non-patent document 4: Nobuyuki Akiyama "Technology Inspecting Foreign Matter" O plus E (2001-5) (measurement and technology for inspecting in semiconductor industry) p 562

Non-patent document 5: The Japan Society for Precision Engineering, edited by the image applied technology expert committee, "Image Processing Applied System", Tokyo Denki University Press, p 145

DISCLOSURE OF THE INVENTION

Issues that the Invention is to Solve

However, in the related art, there are following problems to be solved.

(1) In the method of performing the convolution of the Fourier transformed (FFT) images of the reference image and the checked image and the inverse Fourier transform (FFT) thereof for the check of the defective image of the minute lack, projection or the like in the conventional digital image processing method, there has been a problem that pre-processing of locating of the two images to be compared in the image processing is required, and a considerable time is required for that.

(2) Besides, in the conventional digital image processing method, in order to identify a very minute defect in a large size image, a comparison is made in the image recorded on the pixels of the electronic camera, and accordingly, the enlargement of the minute object is indispensable, and there has been a problem that when the enlargement is performed, the field of view for identification must be narrowed.

(3) Further, in the Fourier transformed image comparison method as the optical analog identification method, an expensive equipment such as a multiple matched filter and a high level technique are used, and further, it is necessary to finally digitally display a detected image defect or the like, and there has been a problem that the check system becomes complicated.

In view of the above, the invention achieves, for example, following objects.

(1) Differently from the digital image processing technique using the convolution of the Fourier transformed (TFT) images of the reference image and the checked image and the inverse Fourier transform (FFT) thereof conventionally performed for the check of the defective image of the minute lack, projection or the like, the invention has an object to provide a new method and apparatus for digital image inspection for a defect check of a general image or image comparison, in which only a defective portion or a differential portion of a checked image, together with its position, is image-displayed, and a pre-processing of positioning of images is not required. For that purpose, in the invention, for example, an amplitude spectrum (intensity information) pattern and a phase spectrum (phase information) pattern of a Fourier transformed image of a reference image are separated, and a difference between the amplitude spectrum (intensity information) of the Fourier transformed image of the reference image and an amplitude spectrum (intensity information) of a Fourier transformed image of a checked image, and the phase spectrum (phase information) of the Fourier transformed image of the reference image are used to form an inverse Fourier transformed image.

(2) The invention has an object to provide a large visual field instantaneous method and apparatus for image inspection for a minute defect of a patterned board, a pollutant minute particle or the like and its position, in which only a defective portion of an image is displayed for a quick check of a minute defect, an attached pollutant minute particle or the like of an opaque patterned board, an electronic board, a mount board or the like. For that purpose, the invention provides a digital image processing method in which for example, a reference board image is photographed by a CCD camera (electronic camera), a Fourier transformed image thereof is divided into an amplitude spectrum and a phase spectrum, the difference is taken from an amplitude spectrum (intensity information) of a Fourier transformed image of a checked image obtained by projecting a checked board image through a Fourier transform lens and by capturing it through an electronic camera, and it is combined with the phase spectrum of the reference board image.

Incidentally, in the invention, for example, a sharp acquisition apparatus of a reference image or the like provides a novel system in which a reference image or a checked image is placed at a front focal plane of a Fourier transform lens, the reference image is captured by an electronic camera at a back focal plane of an inverse Fourier transform lens having a back focal plane of the Fourier transform lens as a front focal plane, and an amplitude spectrum (intensity information) of a Fourier transformed image of the checked image is captured by the electronic camera at the back focal plane of the Fourier transform lens.

(3) The invention has an object to enable a defect check without using a pre-processing of positioning of images and an expensive equipment as in the conventional method, such as the conventional digital image processing method using the FFT and the convolution operation requiring a lot of time in the pre-processing, or the optical analog image processing method using the expensive equipment such as a spatial optical modulator.

(4) The invention has an object to obtain a sharpened image of an amplitude spectrum (intensity information) of a Fourier transformed image of a reference image or a checked image by using a method, not existing in the conventional method, as an acquisition method of a sharpened large visual field image of the reference image or the checked image. That is, in the invention, for example, acquisition of a sharpened image of an amplitude spectrum (intensity information) of a Fourier transformed image of a reference image or a checked image is performed by a large visual field acquisition method of an image, not existing in the conventional method, in which a laser light flux of a suitable wavelength, which has passed through a ½ wavelength plate and is made enlargement parallel or scanning parallel, is irradiated to the whole surface of a board surface or an image surface from an oblique direction with a specific angle or a parallel or vertical direction, and for the photographing of the image surface, a CCD camera (electronic camera) provided with a polarizer and a wavelength filter in front thereof is used to take a sharpened image of the whole surface of the board caused by a specific polarizing characteristic of a light scattering image and a wavelength characteristic.

Means for Solving the Problems (1) In the invention, especially differently from the conventional digital image processing operation, an inverse Fourier transformed image is formed by using a difference in amplitude spectrum (intensity information) between a reference image and a Fourier transformed image of a checked image and a phase spectrum (phase information) of a Fourier transformed image of the reference image, and a defect check of the checked image is performed, which is a novel image processing computing method. In the novel image processing method, since a phase spectrum of the Fourier transformed image of the checked image may not be used for calculation, the computing work is reduced by that and the computing becomes fast as compared with the conventional method, and further, since the pre-processing of positioning of two images is not required for the computing, there is a feature that the conventional digital image processing method falls short of the invention.

(2) In the invention, information of a minute defect of a checked image is converted into an optical diffraction pattern of the minute defect obtained by irradiation of a laser light, that is, an amplitude spectrum (intensity information) of a Fourier transformed image, and since the optical diffraction pattern of a minute object is enlarged as the size becomes small, there is a feature that the minute defect or the like can be detected quickly and in a large field of view without performing the enlargement of an image for the detection of a minute defect, minute particle or the like, which is performed in the conventional digital image processing method. Accordingly, in the invention, the checking of a minute defect, a pollutant minute particle or the like on a large size pattern drawn board becomes easy, which has been conventionally considerably difficult, and the display of the result becomes very easy and quick.

(3) In the invention, even if the position of a checked board is shifted back and forth and left and right within an irradiation light flux, since the optical diffraction pattern of the checked board appears on the optical axis center of a Fourier transform lens without fail, and further, since the amplitude spectrum (intensity information) of the Fourier transformed image of the checked image appears on the screen center even if the position of the checked image is shifted back and forth and left and right within the irradiation light flux, there is a feature that accurate positioning of the checked board and the like and the pre-processing of images are not required.

(4) By the invention, a suitable digital/analog hybrid image processing method is efficiently used, and the identification time of a defect image and the processing time until the display of a check result become remarkably short as compared with the related art.

(5) In the invention, as compared with the Fourier transformed image comparison method as the optical analog identification method, it is unnecessary to use the expensive equipment such as the multiple matched filter and the high level technique, and there is a merit that as compared with the multiple matched filter method, the final display of the detected image defect or the like becomes easy and fast.

(6) In the invention, the conventional problem is solved by, as an acquisition method of a sharpened image of a reference image or a checked image, a new system in which the whole surface of a checked board is irradiated with a parallel laser light flux in which the polarizing plane is adjusted and the wavelength selection of complementary color or the like is performed, and only a suitable polarizing plane and wavelength image is received by the whole screen. Incidentally, in the conventional measurement optical system, a thin laser beam is irradiated to scan a measured object, and the whole surface of the measured image is checked.

As described above, in various points, the invention can not be easily conceived from, for example, the conventional digital image judgment method in which the comparison of two images is performed by the FFT and convolution, and also, the invention is not such a technique that is easily conceived from the conventional optical analog image identification method.

According to the first solving means of the present invention, there is provided a method for image inspection comprising:

capturing, by a computer, a reference image or a Fourier transformed image of the reference image from a storage part or a camera to obtain intensity information and/or phase information of the Fourier transformed image of the reference image;

capturing, by the computer, an identified image or a Fourier transformed image of the identified image from the storage part or the camera to obtain intensity information and/or phase information of the Fourier transformed image of the identified image;

taking, by the computer, a difference in intensity information between the Fourier transformed image of the reference image and the Fourier transformed image of the identified image to obtain an inverse Fourier transformed image of an expression by the differential intensity information and the phase information of the Fourier transformed image of one of the reference image and the identified image;

outputting, by the computer, the inverse Fourier transformed image to an output part or a display part; and extracting, by the inverse Fourier transformed image, an image defect of the identified image or a difference in image between the reference image and the identified image as a difference between the identified image and the reference image.

According to the above method for image inspection of the present invention, the computer can capture the reference image from the storage part or a second camera, and Fourier transform the reference image to obtain the intensity information and the phase information, and the computer can acquire the intensity information of the Fourier transformed image of the identified image from the storage part or the first camera.

According to the above method for image inspection of the present invention, the computer can capture the reference image from the storage part or a second camera, and Fourier transform the reference image to obtain the intensity information and the phase information, and the computer can capture the identified image from the storage part or the second camera, and obtain the intensity information of the Fourier transformed image of the identified image.

According to the above method for image inspection of the present invention, the computer can acquire the intensity information of the Fourier transformed image of the reference image from the storage part or a first camera, the computer can capture the reference image from the storage part or a second camera, and Fourier transform the reference image to obtain the phase information, and the computer can acquire the intensity information of the Fourier transformed image of the identified image from the storage part or the first camera.

According to the above method for image inspection of the present invention, the computer can acquire the intensity information of the Fourier transformed image of the reference image from the storage part or a first camera, the computer can capture the reference image from the storage part or a second camera, and Fourier transform the reference image to obtain the phase information, and the computer can capture the identified image from the storage part or a second camera, and obtain the intensity information of the Fourier transformed image of the identified image.

According to the above method for image inspection of the present invention, the computer can capture the identified image from the storage part or a second camera, and Fourier transform the identified image to obtain the intensity information and the phase information, and the computer can acquire the intensity information of the Fourier transformed image of the reference image from the storage part or a first camera.

According to the above method for image inspection of the present invention, the computer can capture the identified image from the storage part or a second camera, and Fourier transform the identified image to obtain the intensity information and the phase information, and the computer can capture the reference image from the storage part or the second camera, and obtain the intensity information of the Fourier transformed image of the reference image.

According to the above method for image inspection of the present invention, the computer can acquire the intensity information of the Fourier transformed image of the identified image from the storage part or a first camera, the computer can capture the identified image from the storage part or a second camera, and Fourier transform the identified image to obtain the phase information, and the computer can acquire the intensity information of the Fourier transformed image of the reference image from the storage part or the first camera.

According to the above method for image inspection of the present invention, the computer can acquire the intensity information of the Fourier transformed image of the identified image from the storage part or a first camera, the computer can capture the identified image from the storage part or a second camera, and Fourier transform the identified image to obtain the phase information, and the computer can capture the reference image from the storage part or the second camera, and obtain the intensity information of the Fourier transformed image of the reference image.

According to the second solving means of the present invention, there is provided an apparatus for image inspection comprising:

a laser light source;

a camera that obtains a reference image, an identified image, or a Fourier transformed image of the reference image or the identified image;

an optical system that converts a light from the laser light source into a parallel light, irradiates it to a check object, and causes the reflected light or transmitted light from the check object to be incident on the camera; and a computer that includes an image storage part to store a detected image and a display part or an output part to output the image, and processes the image obtained by the camera, wherein the computer captures a reference image or a Fourier transformed image of the reference image from the storage part or the camera, and obtains intensity information and/or phase information of the Fourier transformed image of the reference image, the computer captures an identified image or a Fourier transformed image of the identified image from the storage part or the camera, and obtains intensity information of the Fourier transformed image of the identified image, the computer takes a difference in intensity information between the Fourier transformed image of the reference image and the Fourier transformed image of the identified image and obtains an inverse Fourier transformed image of an expression by the differential intensity information and the phase information of the Fourier transformed image of one of the reference image and the identified image, and the computer outputs the inverse Fourier transformed image to an output part or a display part, and extracts, by the inverse Fourier transformed image, an image defect of the identified image or a difference in image between the reference image and the identified image as a difference between the identified image and the reference image.

Advantages of the Invention

The invention has following advantages.

(1) According to the invention, especially differently from the conventional digital image processing operation, the novel image processing computing method is proposed and used in which the inverse Fourier transformed image is formed by using the difference in the amplitude spectrum (intensity information) between the reference image and the Fourier transformed image of the checked image and the phase spectrum (phase information) of the Fourier transformed image of the reference image, and the defect check of the checked image is performed, and accordingly, the new technique has been developed which does not require the pre-processing of positioning of images and is superior to the conventional digital image processing method.

(2) Besides, in the newly developed checking method, the information of the minute defect of the checked image is converted into the optical diffraction pattern of the minute defect obtained by the irradiation of the laser light, that is, the amplitude spectrum (intensity information) of the Fourier transformed image, and since the optical diffraction pattern of the minute object is enlarged as the size becomes small, the minute defect, the minute particle or the like can be detected in a large field of view and quickly without using an enlarged image. Accordingly, in the invention, the checking of a minute defect, a pollutant minute particle or the like on a large size pattern drawn board, the identification of which has been conventionally considerably difficult, becomes easy, and the display of the result becomes very easy and quick.

(3) Further, in the invention, even if the position of the checked board is shifted back and forth and left and right within the irradiation light flux, since the optical diffraction pattern of the checked board appears on the optical axis center of the Fourier transform lens without fail, and further, since the amplitude spectrum (intensity information) of the Fourier transformed image of the checked image appears on the screen center even if the position of the checked image is shifted back and forth and left and right within the irradiation light flux, the accurate positioning of the checked board and the like and the pre-processing of the images are not required.

(4) Furthermore, in the invention, since the suitable digital/analog hybrid image processing method is used, the processing time until the display of the check result of the defective image becomes remarkably short as compared with the related art.

(5) In addition, according to the invention, as compared with the Fourier transformed image comparison method as the optical analog identification method, it is unnecessary to use the expensive equipment such as the multiple matched filter and the high level technique, and there is a merit that as compared with the multiple matched filter method, the final display of the detected image defect or the like becomes easy and fast.

(6) Besides, in the conventional measurement optical system, the thin laser beam is irradiated to scan the measured object, and the whole surface of the measured image is checked. On the other hand, according to the invention, as the acquisition method of the sharpened image of the reference image or the checked image, the optical system different from the conventional method is adopted for both the irradiation optical system and the light receiving optical system, and accordingly, the whole surface of the checked board is irradiated with the parallel laser light flux in which the polarizing plane is adjusted and the wavelength selection of the complementary color or the like is performed, and only the suitable polarizing plane and wavelength image is received by the whole screen.

(7) The invention is superior in the method in which the check accuracy is raised and the check speed is increased.

(8) The invention is superior in that the whole of the screen is checked at the same time and in the check speed which is not in the conventional method.

(9) According to the invention, the apparatus is relatively simple in the structure, and is superior in the manufacture cost as compared with the conventional method.

DESCRIPTION OF THE PREFERRED EMBODIMENTS

1. Basic Principle of Method for Image Inspection

Figure 1:
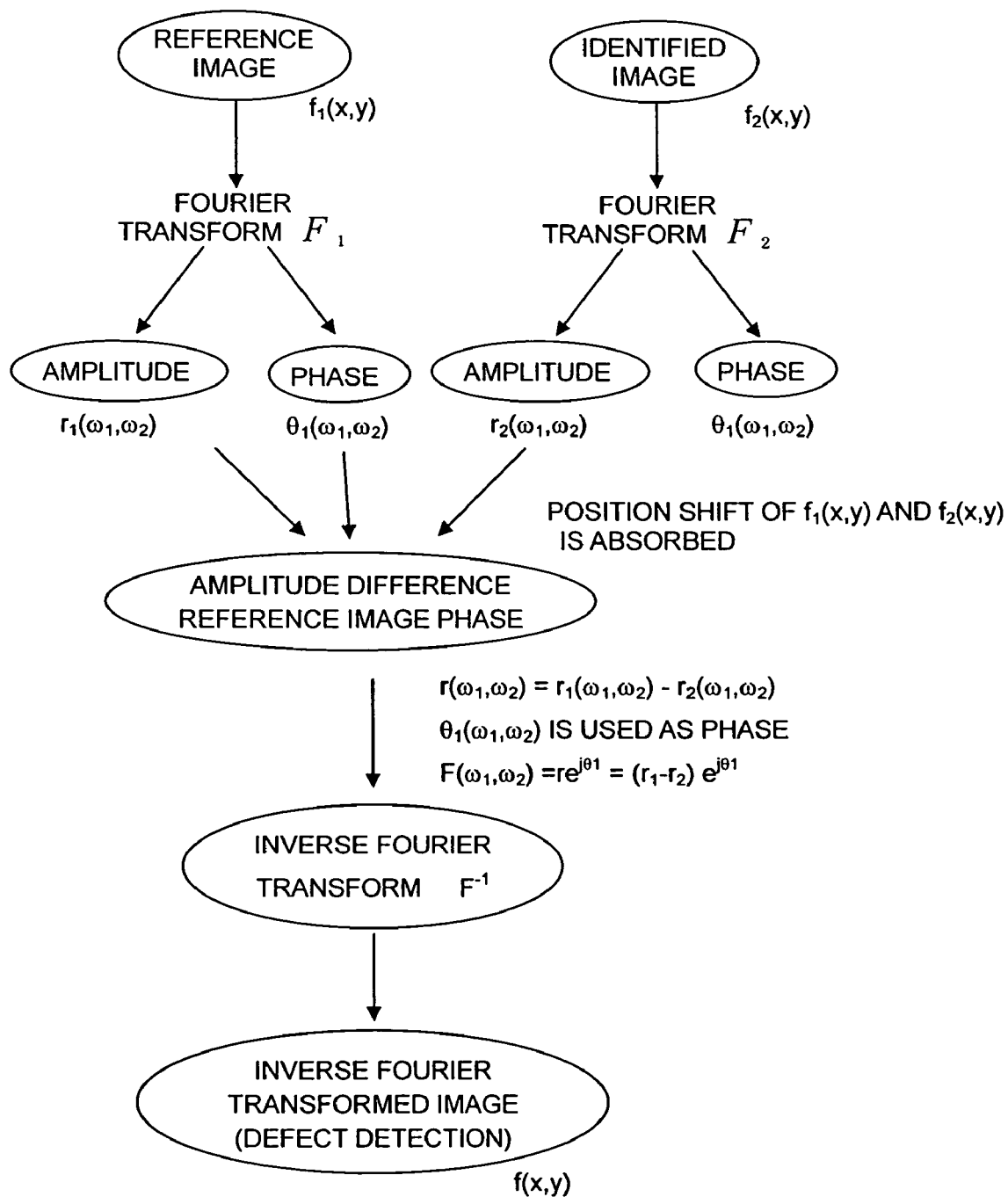
[FIG. 1] An explanatory view of a method for image inspection.

FIG. 1 is an explanatory view of a method for image inspection.

In this figure, as an example, a checking method of a digital image defect is explained. Hereinafter, in embodiments, although a description will be mainly given to, as an example, a check of a defect or foreign matter, the invention is not limited to this, but can be applied to a comparison check of a reference image and an identified image, or the like.

Figure 2:
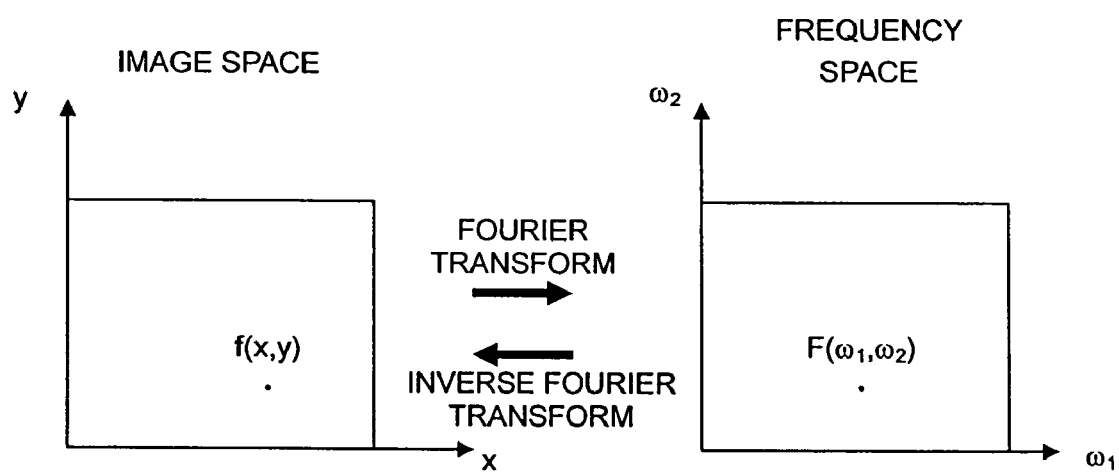
[FIG. 2] An explanatory view of an image space and a frequency space.

1.1 Theoretical Development of Amplitude Spectrum Difference Image System (1) Definition of Two-Dimensional Fourier Transform FIG. 2 is an explanatory view of an image space and a frequency space.

When $f(x, y)$ is a reference image signal (intensity of light), the definitional equation of two-dimensional Fourier transform is indicated as follows:

$$F(\omega_1, \omega_2) = \int_{-\infty}^{\infty}\int_{-\infty}^{\infty} f(x, y)\exp\{-j(\omega_1 x + \omega_2 y)\}\,dx\,dy \quad \text{[Math. 1]}$$
$$= u(\omega_1, \omega_2) + jv(\omega_1, \omega_2)$$

Where, $\omega_1, \omega_2$: spatial frequency

When expressed in polar form, $$F(\omega_1,\omega_2)=u+jv=re^{j\theta}$$

Where, $$r=r(\omega_1,\omega_2)=\sqrt{u^2+v^2}$$

:amplitude $$\theta = \theta(\omega_1, \omega_2) = \tan^{-1}\frac{v}{u} : \text{phase}$$

Besides, the definitional equation of two-dimensional inverse Fourier transform is expressed as follows:

[Math. 2]

$$f(x, y) = \int_{-\infty}^{\infty}\int_{-\infty}^{\infty} F(\omega_1, \omega_2)\exp\{j(\omega_1 x + \omega_2 y)\}\,d\omega_1\,d\omega_2$$

(2) Basic Principle and Mathematical Formula Representation

Now, when a reference image is $f_1(x,y)$, and an identified image is $f_2(x,y)$, after both the images are mapped to the frequency space by the Fourier transform, when they are expressed in polar form, the following expressions are obtained.

[Math. 3]

reference image $$F_1(\omega_1, \omega_2) = \int_{-\infty}^{\infty}\int_{-\infty}^{\infty} f_1(x, y)\exp\{-j(\omega_1 x + \omega_2 y)\}\,dx\,dy$$
$$= u_1 + jv_1$$
$$= r_1 e^{j\theta_1}$$

Where, $$r_1 = \sqrt{u_1^2 + v_1^2},\; \theta_1 = \tan^{-1}\frac{v_1}{u_1}$$

identified image $$F_2(\omega_1, \omega_2) = \int_{-\infty}^{\infty}\int_{-\infty}^{\infty} f_2(x, y)\exp\{-j(\omega_1 x + \omega_2 y)\}\,dx\,dy$$
$$= u_2 + jv_2$$
$$= r_2 e^{j\theta_2}$$

Where, $$r_2 = \sqrt{u_2^2 + v_2^2},\; \theta_2 = \tan^{-1}\frac{v_2}{u_2}$$

Here, a difference between amplitudes is created as indicated by a following expression.

$$r(\omega_1, \omega_2)=r_1(\omega_1, \omega_2)-r_2(\omega_1, \omega_2)$$

Further, using the differential amplitude and the phase of the reference image, it is expressed in polar form by a following expression.

[Math. 4]

$$F(\omega_1,\omega_2)=re^{j\theta_1}=(r_1-r_2)e^{j\theta_1}$$

Further, when this is inversely mapped to the image space by the inverse Fourier transform, a following expression is obtained.

$$f(x, y) = \int_{-\infty}^{\infty}\int_{-\infty}^{\infty} F(\omega_1, \omega_2)\exp\{j(\omega_1 x + \omega_2 y)\}\,d\omega_1\,d\omega_2 \quad \text{[Math. 5]}$$

The inverse Fourier transformed image f(x,y) represents a defect (or a comparison result).

(3) Modified Example of Mathematical Formula Representation

When the foregoing $F(\omega_1, \omega_2)$ is obtained, the phase of the identified image may be used instead of the phase of the reference image. In that case, $F(\omega_1, \omega_2)$ can be expressed by a following modified expression in polar form by using the differential amplitude of the reference image and the identified image and the phase of the identified image.

[Math. 6]

$$F(\omega_1,\omega_2)=re^{j\theta_2}=(r_1-r_2)e^{j\theta_2}$$

Further, as in the expression indicated above, when this is universely mapped to the image space by the inverse Fourier transform, the inverse Fourier transformed image f(x,y) is obtained, and the inverse Fourier transformed image f(x,y) indicates a defect (or a comparison result).

Incidentally, when the foregoing $F(\omega_1, \omega_2)$ is obtained, $(r_2-r_1)$ may be used instead of $(r_1-r_2)$.

1.2 Basic Principle of Digital Image Defect Check

Figure 3:
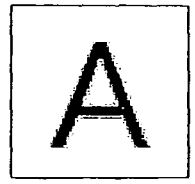
[FIG. 3] An explanatory view of the basic principle of a digital image defect check.

FIG. 3 is an explanatory view of the basic principle of a digital image defect check.

This figure shows an example in which as described above, a reference image is compared with identified images (with defect) of two patterns, and its defect is detected.

As shown in the figure, in a sample with a general image defect, a result of the digital image defect checking method of the embodiment is shown. This figure shows the example of the defect check result in which it is assumed that both the reference image and the checked image are captured by a digital camera and are checked. As a result of the image defect check, it has been confirmed that the general image defect can be simply and quickly identified and displayed irrespective of the position of the checked image.

With respect to the check result of the case where the image defect check is performed by capturing the reference image by the digital camera and by capturing the optical diffraction pattern of the Fourier transformed image of the checked image at the back focal plane of a Fourier transform lens, from the above result, it is predicted that the check result can be obtained without a problem.

A following method is used to obtain a sharpened image of the reference image or the checked image and to acquire the amplitude spectrum (intensity information) and phase spectrum (phase information) of the Fourier transformed image of the image.

(a) In an irradiation optical system, an oblique irradiation having a specific angle with respect to a board surface or an image surface, or parallel irradiation, or vertical direction irradiation is performed by an enlarged parallel laser light flux having passed through a ½ wavelength plate.

(b) The optical system to acquire the reference image or the checked image is constructed of a relay lens system in which the image surface is placed at a front focal plane of a Fourier transform lens, and the acquisition is made at a back focal plane of an inverse Fourier transform lens which has, as its front focal plane, a back focal plane of the Fourier transform lens. The reference image or the checked image is acquired at the rearmost focal plane of the relay lens system for image size coincidence.

(c) On the other hand, a Fourier transformed image generated from the board surface including the reference image or the checked image or those images is photographed by a light receiving optical system constructed of a CCD camera (electronic camera) with a polarizer and a wavelength filter. The polarizer and the wavelength filter improve image quality, and enable the composition measurement of an image on a board, such as a gold plating, and the light absorption of a specific material surface is used for sharpening of the image.

(d) The photographing of the amplitude spectrum (intensity information) of the Fourier transformed image of the checked image is performed at the back focal plane of the Fourier transform lens of the optical system described in the foregoing paragraph. Incidentally, as the need arises, the photographing of the amplitude spectrum (intensity information) of the Fourier transformed image of the reference image is also performed at the back focal plane of the Fourier transform lens.

2. Apparatus for Image Inspection

Figure 4:
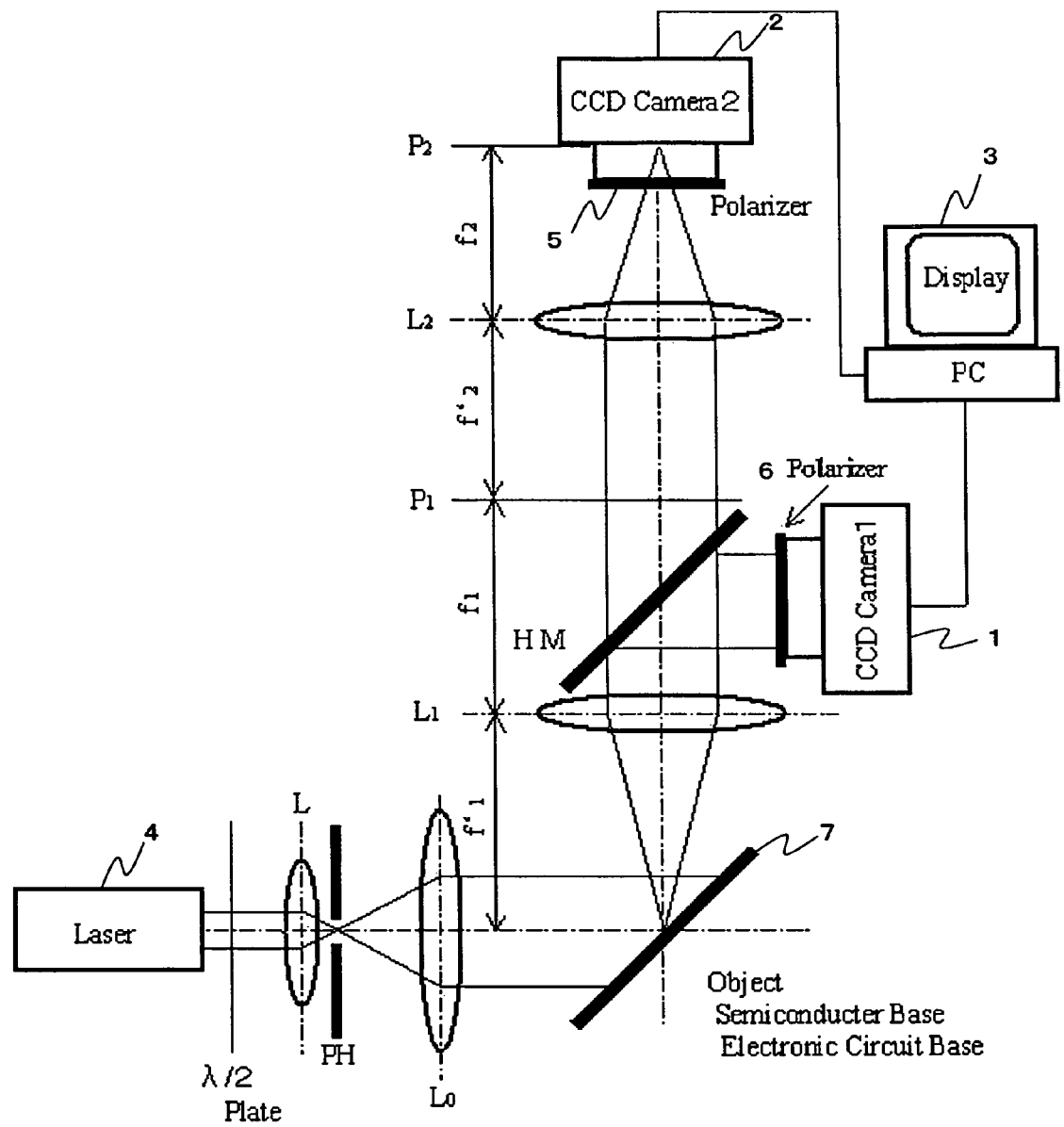
[FIG. 4] A structural view of a measurement optical system of an apparatus for image inspection.

FIG. 4 shows an example of a structural view of a measurement optical system of an apparatus for image inspection.

The measurement optical system includes a CCD camera (electronic camera, digital camera) 1, a CCD camera (electronic camera, digital camera) 2, a computer 3, a laser 4, polarizers 5 and 6, a check object 7, lenses L, $L_0$, $L_1$, $L_2$, a spatial filter PH, a half mirror HM, and a ½ wavelength plate. As described later, the CCD camera 1 and the half mirror HM can be omitted in the case where they are not required according to a mode. Besides, as the need arises, the computer 3 can suitably select, by input from an input part or the like or previously determined setting, which of images of the CCD cameras 1 and 2 is inputted. Incidentally, for the acquisition of the sharpened image of the reference image or the checked image, the relay lens system as stated above may not be used. As the check object 7, something for acquisition of the checked image or the reference image, such as a board, is disposed at the illustrated position. Incidentally, the reference image or the Fourier image thereof may be previously stored in a storage view, and the computer 3 may read and use it as the need arises.

Next, an image photographing position and its reason will be described.

1) With respect to an image of a reference board, a measured board or the like, basically, a material body image at the check target (object) position is photographed by the CCD camera 2. An amplitude spectrum and a phase spectrum are separated from a Fourier transformed image of the photographed image, and the amplitude spectrum and the phase spectrum are used for identification of a defective image.

2) A minute image is included in the image of the reference board, the measured board or the like, and with respect to the defect identification of such a small image that the minute image is not photographed in a pixel of the CCD camera unless the image is enlarged, the amplitude spectrum of the Fourier transformed image of the board placed at the object position is photographed at the position of the CCD camera 1. With respect to the phase spectrum of the reference board, the image is photographed at the position of the CCD camera 2, and the phase spectrum of the Fourier transformed image of the image is used for the defect identification.

3) With respect to an optical diffraction pattern obtained when a laser light impinges on an object and is scattered, as the object becomes small, the spreading angle thereof becomes large. That is, in the image processing using the optical diffraction pattern, as the object becomes minute, the information of the minute object is enlarged and can be extracted in a large field of view.

4) There is a feature that even if the position of the object is located at any position, the optical diffraction pattern appears, overlapping with the optical axis center at the back focal plane of the Fourier transform lens.

Figure 5:
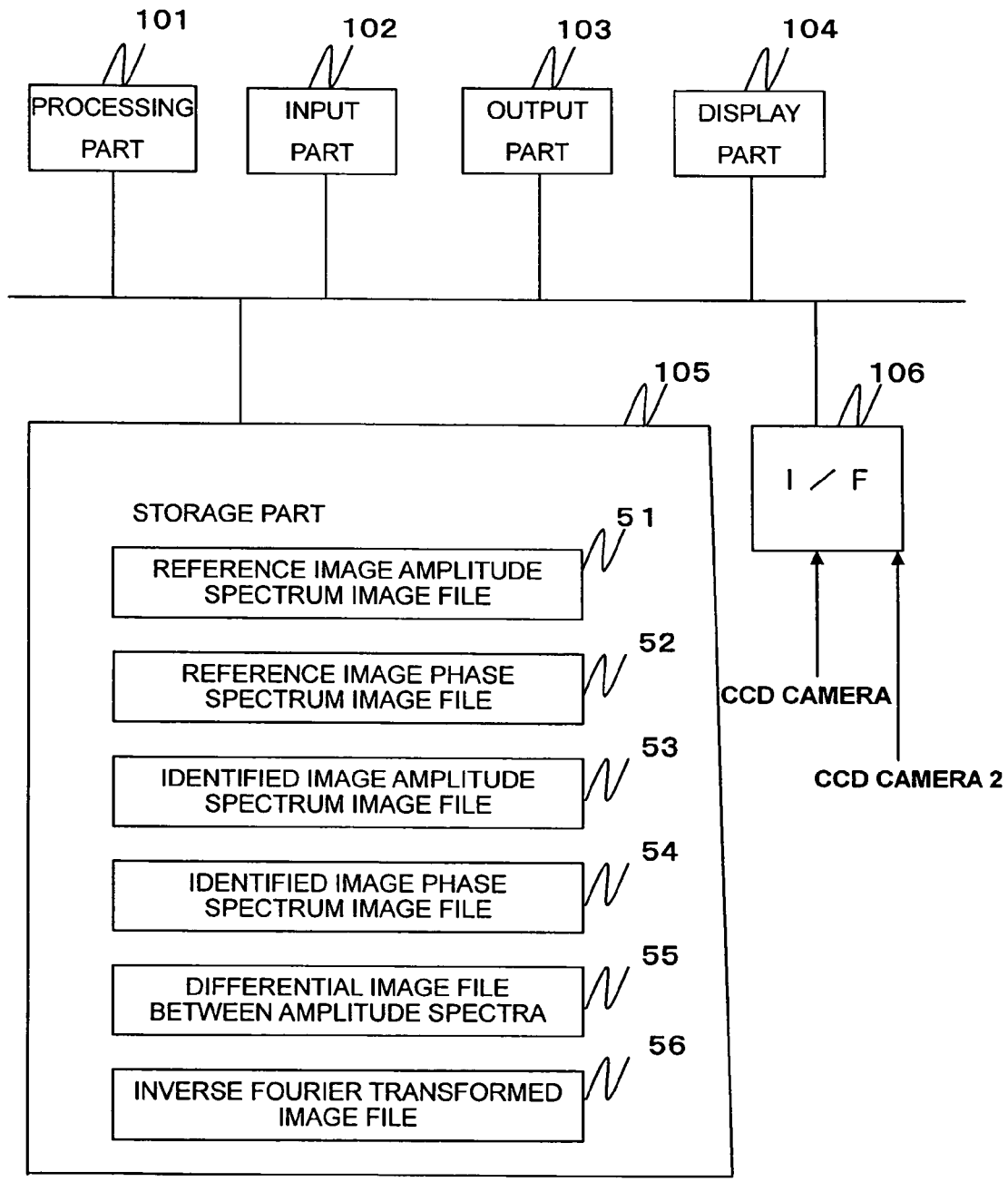
[FIG. 5] A structural view of hardware relating to a computer.

FIG. 5 is a structural view of hardware relating to the computer.

The computer 3 includes a processing part 101 as a central processing unit (CPU), an input part 102, an output part 103, a display part 104, a storage part 105, and an interface part (I/F) 106. Besides, the processing part 101, the input part 102, the output part 103, the display part 104, the storage part 105, and the interface part (I/F) 106 are connected by suitable connection means such as a star or a bus. The storage part 105 includes a reference image amplitude spectrum image file 51, a reference image phase spectrum image file 52, an identified amplitude spectrum image file 53, an identified phase spectrum image file 54, a difference image file 55 between amplitude spectra, and an inverse Fourier transformed image file 56.

3. Image Detection Processing

Hereinafter, with respect to an extraction drawing method of a minute defect on an image or a difference on a minute image, various embodiments will be described. Incidentally, in respective steps of respective flowcharts described below, at the step of "input of a reference image" or "input of a Fourier transformed image of a reference image", the reference image is arranged at the position of the check object 7 and is measured in the apparatus shown in FIG. 4, whereas at the step of "input of an identified image" or "input of a Fourier transformed image of an identified image", the identified image is arranged at the position of the check object 7 and is measured.

(1) First Embodiment (Reference Image, Identified Image)

Figure 6:
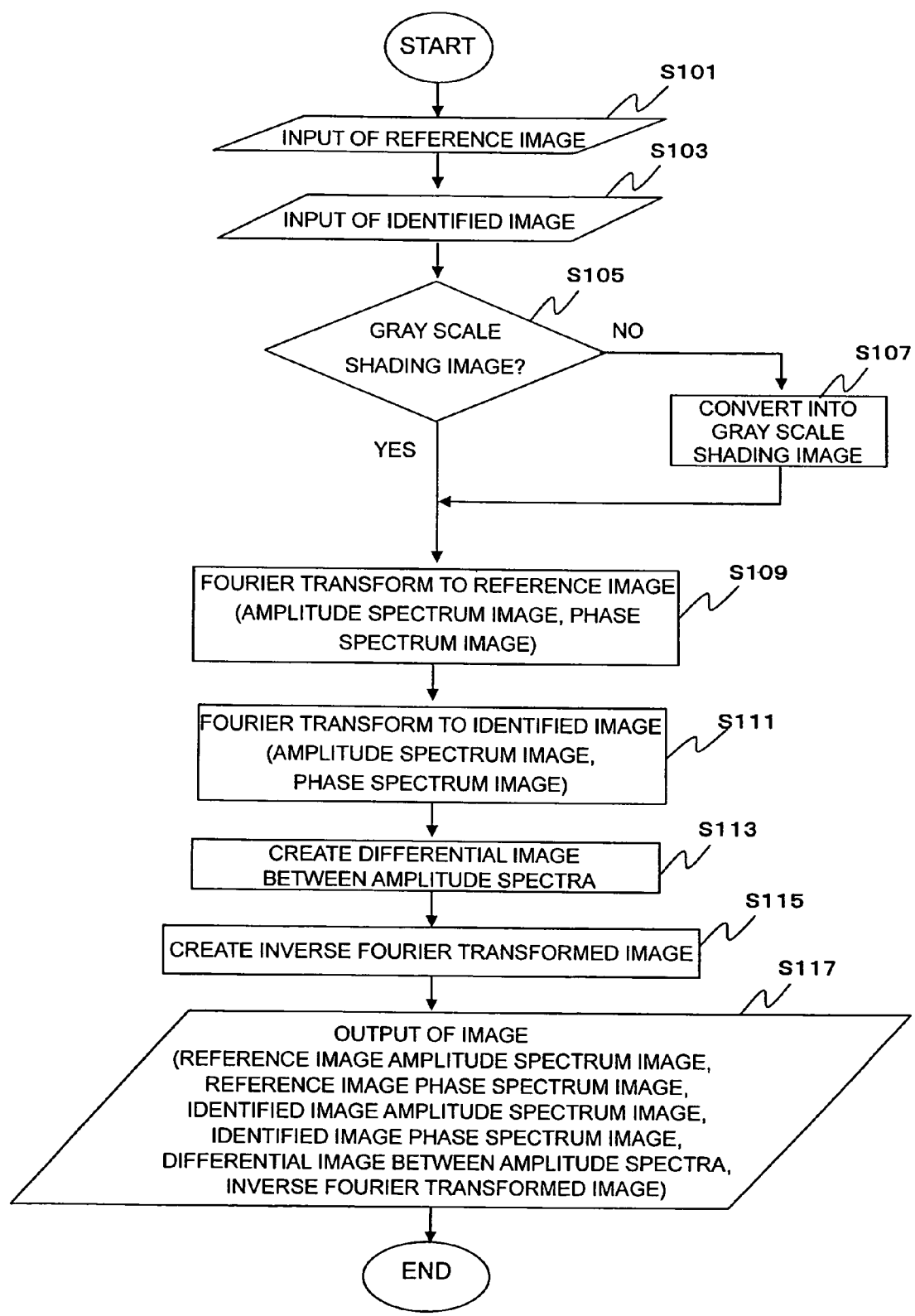
[FIG. 6] A flowchart of a first embodiment of a method for image inspection.

FIG. 6 is a flowchart of a first embodiment of a method for image inspection.

The computer 3 (processing part 101, the same applies hereinafter) captures a reference image from the storage part 105 or the CCD camera 2 through the interface part 106 (S101) The computer 3 captures an identified image from the storage part 105 or the CCD camera 2 through the interface part 106 (S103) Incidentally, in the case where the reference image or the identified image is previously stored in the storage part 105, the computer 3 reads the data from the storage part 105 and can use it.

Next, the computer 3 judges whether or not the inputted respective images are gray scale images (S105), and converts them into gray scale images as the need arises (S107). Incidentally, in the case where gray scale data is already inputted to the computer 3 through the structure of the CCD camera or the structure of the interface part 106, the steps S105 and S107 can be omitted.

Next, the computer 3 Fourier transforms the reference image and obtains an amplitude spectrum (intensity information) and a phase spectrum (phase information) (S109). Besides, the computer 3 obtains an amplitude spectrum (intensity information) of a Fourier transformed image of the identified image (S111). The computer 3 obtains a difference between the amplitude spectra (intensity information) of the Fourier transformed images of the reference image and the identified image (S113), the differential amplitude spectrum (intensity information) and the phase spectrum (phase information) of the reference image are used, and inverse Fourier transform of expressions (the expression $F(\omega_1, \omega_2)=(r_1-r_2) \exp(j\theta_1)$ in polar form, and the like indicated in "1.1(1) Basic principle and mathematical formula representation") is performed to obtain an inverse Fourier transformed image (S115).

The computer 3 outputs the inverse Fourier transformed image to the output part 103 or the display part 104 (S117). At this time, the computer 3 may suitably read one of or plural of the amplitude/phase spectrum images of the reference image/identified image and the difference image from the storage part 105 or the like and may output or display it. Besides, in the above image detection processing method, in the case where the amplitude spectra (intensity information) of the Fourier transformed images of the reference image and the checked image are coincident to each other, or in the case where the difference between the amplitude spectra (intensity information) of those is zero, the computer 3 may output a signal indicating that the two images are coincident to each other to the screen of the display part 104 or may output the signal to the output part 103.

Incidentally, as the need arises, at suitable steps, the processing part 101 of the computer 3 writes or reads the respective image data to or from the reference image amplitude spectrum image file 51 of the storage part 105, the reference image phase spectrum image file 52, the identified amplitude spectrum image file 53, the identified phase spectrum image file 54, the difference image file 55 between amplitude spectra, and the inverse Fourier transformed image file 56.

As described above, the computer 3 extracts, as the difference between the identified image and the reference image, the image defect of the identified image or the difference in image between the reference image and the identified image.

(2) Second Embodiment (Reference Image, Fourier Transformed Image of Identified Image)

Figure 7:
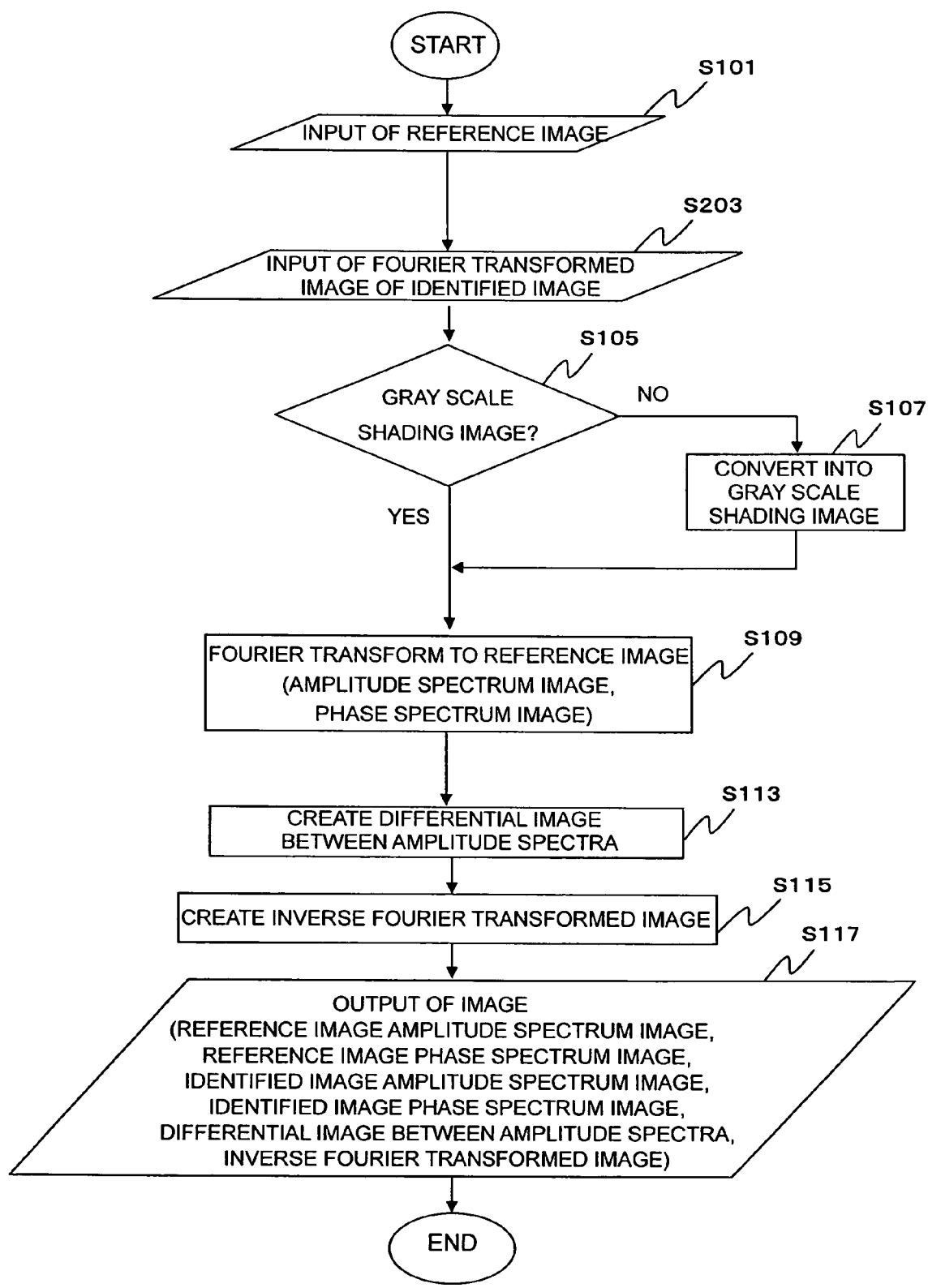
[FIG. 7] A flowchart of a second embodiment of a method for image inspection.

FIG. 7 shows a flowchart of a second embodiment of a method for image inspection.

The computer 3 acquires a reference image from the storage part 105 or the CCD camera 2 through the interface part 106 (S101) The computer 3 acquires an amplitude spectrum (intensity information) of a Fourier transformed image of an identified image from the storage part 105 or the CCD camera 1 through the interface part 106 (S203).

Next, similarly to the first embodiment, the computer 3 executes a processing relating to the gray scale as the need arises (S105, 107).

The computer 3 Fourier transforms the reference image and obtains an amplitude spectrum (intensity information) and a phase spectrum (phase information) (S109).

Hereinafter, the computer executes processing steps S113 to S117 similar to those of the first embodiment.

(3) Third Embodiment (Reference Image and its Fourier Transformed Image, Fourier Transformed Image of Identified Image)

Figure 8:
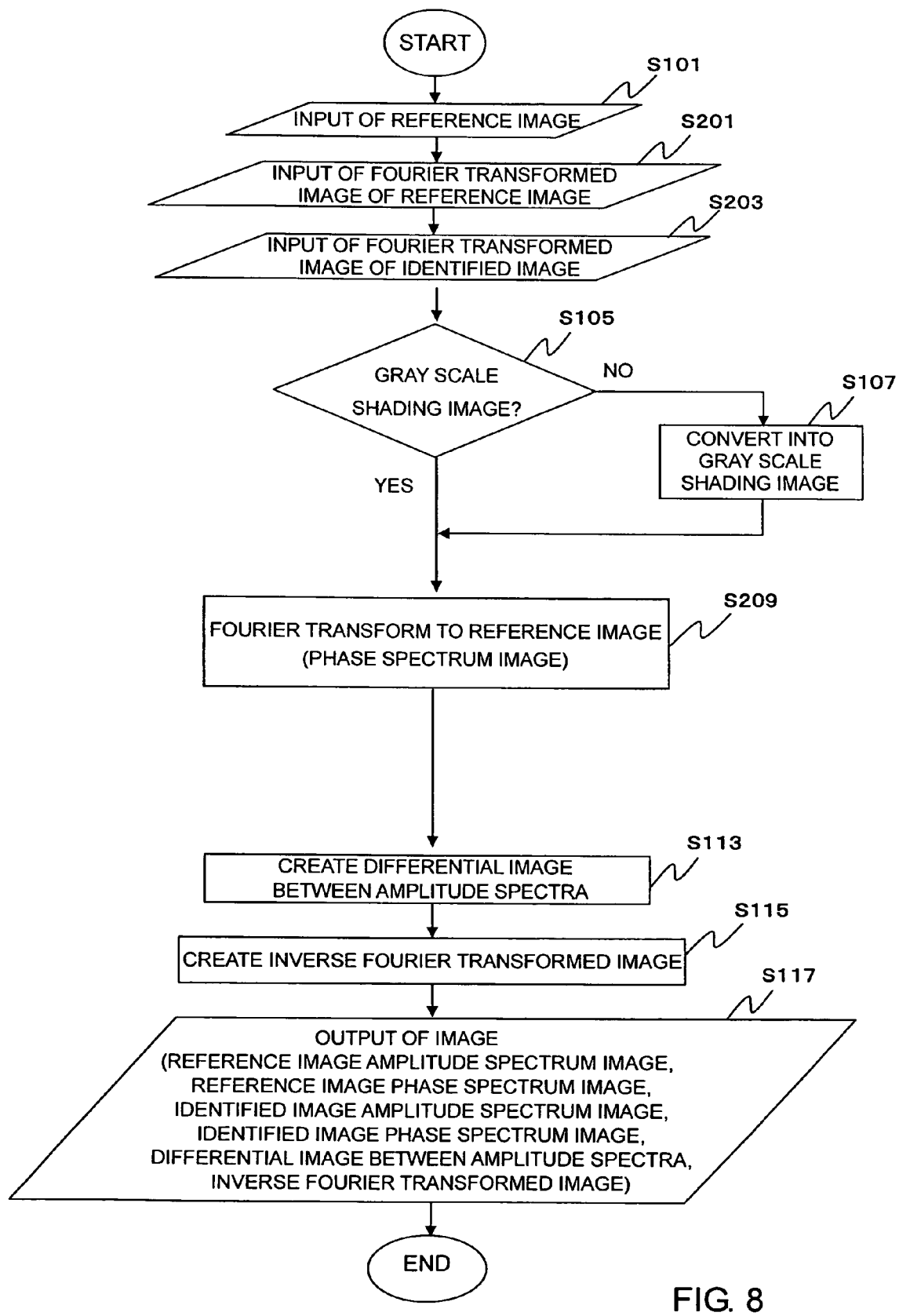
[FIG. 8] A flowchart of a third embodiment of a method for image inspection.

FIG. 8 is a flowchart of a third embodiment of a method for image inspection.

The computer 3 captures a reference image from the storage part 105 or the CCD camera 2 through the interface part 106 (S101) The computer 3 acquires an amplitude spectrum (intensity information) of a Fourier transformed image of the reference image from the storage part 105 or the CCD camera 1 through the interface part 106 (S201). The computer 3 acquires an amplitude spectrum (intensity information) of a Fourier transformed image of an identified image from the storage part 105 or the CCD camera 1 through the interface part 106 (S203).

Next, similarly to the first embodiment, the computer 3 executes a processing relating to the gray scale as the need arises (S105, 107).

The computer 3 Fourier transforms the reference image and obtains a phase spectrum (phase information) (S209).

After this, the computer executes processing steps S113 to S117 similar to those of the first embodiment.

(4) Fourth Embodiment (Reference Image and its Fourier Transformed Image, Identified Image)

Figure 9:
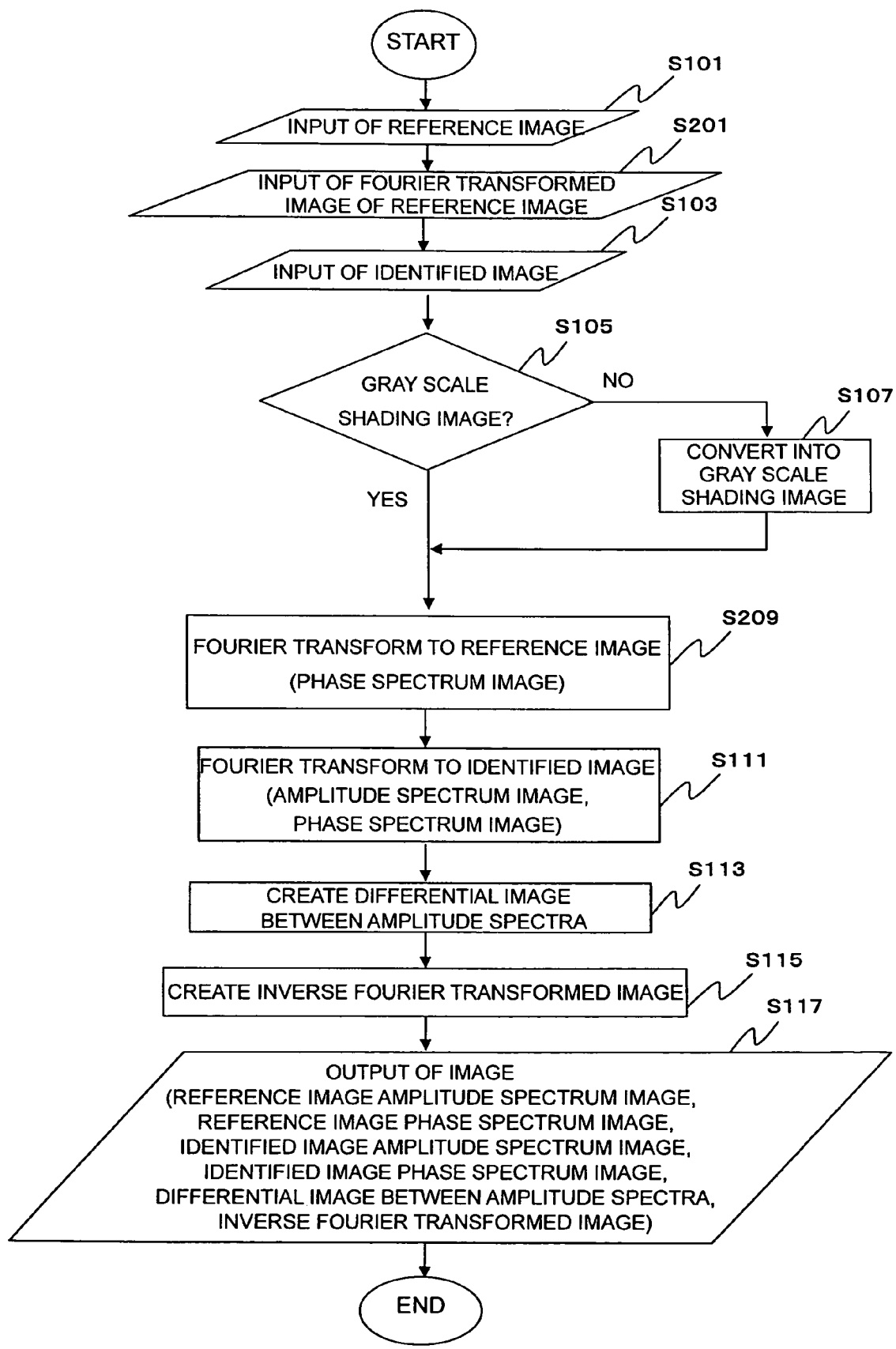
[FIG. 9] A flowchart of a fourth embodiment of a method for image inspection.

FIG. 9 is a flowchart of a fourth embodiment of a method for image inspection.

The computer 3 captures a reference image from the storage part 105 or the CCD camera 2 through the interface part 106 (S101) The computer 3 acquires an amplitude spectrum (intensity information) of a Fourier transformed image of the reference image from the storage part 105 or the CCD camera 1 through the interface part 106 (S201). The computer 3 captures an identified image from the storage part 105 or the CCD camera 2 through the interface part 106 (S103).

Next, similarly to the first embodiment, the computer 3 executes a processing relating to the gray scale as the need arises (S105, 107).

The computer 3 Fourier transforms the reference image and obtains a phase spectrum (phase information) (S209). Besides, the computer 3 obtains an amplitude spectrum (intensity information) of a Fourier transformed image of the identified image (S111).

After this, the computer executes processing steps S113 to S117 similar to those of the first embodiment.

4. Modification of the Image Checking Processing

Hereinafter, modified examples of the flowcharts described in "3. Image checking processing" will be described. In the foregoing examples, as the phase spectrum (phase information), that of the reference image is used and the inverse Fourier transformed image is calculated, however, in the modified examples, as the phase spectrum (phase information), that of an identified image is used, and an inverse Fourier transformed image is calculated. Incidentally, respective steps of the same number denote the same processing.

Figure 10:
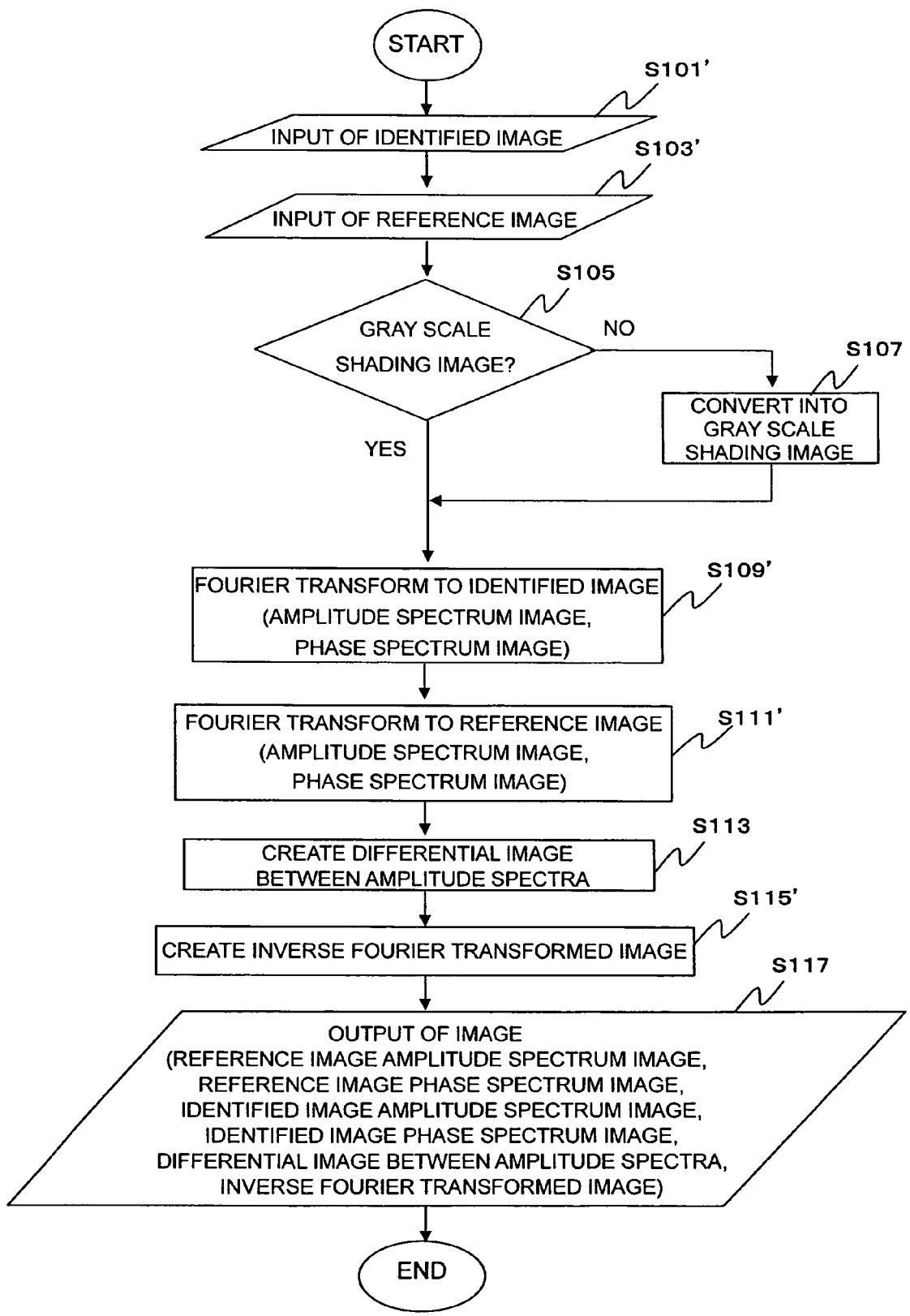
[FIG. 10] A flowchart of a modified example of the first embodiment of the method for image inspection.

(1) Modified Example (Identified Image, Reference Image) of the First Embodiment FIG. 10 shows a modified example of a flowchart of a modified example of the first embodiment of the method for image inspection.

The computer 3 (processing part 101, the same applies hereinafter) captures an identified image from the storage part 105 or the CCD camera 2 through the interface part 106 (S101'). The computer 3 captures a reference image from the storage part 105 or the CCD camera 2 through the interface part 106 (S103'). Incidentally, in the case where the identified image or the reference image is previously stored in the storage part 105, the computer 3 reads the data from the storage part 105 and can use it.

Next, the computer 3 executes steps S105 and S107 similarly to the first embodiment.

Next, the computer 3 Fourier transforms the identified image and obtains an amplitude spectrum (intensity information) and a phase spectrum (phase information) (S109'). Besides, the computer 3 obtains an amplitude spectrum (intensity information) of a Fourier transformed image of the reference image (S111'). The computer 3 obtains a difference between the amplitude spectra (intensity information) of the Fourier transformed images of the identified image and the reference image (S113), the differential amplitude spectrum (intensity information) and the phase spectrum (phase information) of the identified image are used, and inverse Fourier transform of expressions (the modified expression $F(\omega_1, \omega_2) = (r_1-r_2)\exp(j\theta_2)$ in polar form, and the like indicated in "1.1(3) Modified example of mathematical formula representation") is performed to obtain an inverse Fourier transformed image (S115').

Next, the computer 3 executes step S117 similarly to the first embodiment. Besides, a processing relating to the exchange of data with the output part 103 or the display part 104 and the storage part 105 is similar to that of the first embodiment.

In the manner as described above, the computer 3 extracts, as the difference between the reference image and the identified image, the image defect of the reference image or the difference in image between the identified image and the reference image by the inverse Fourier transformed image.

Figure 11:
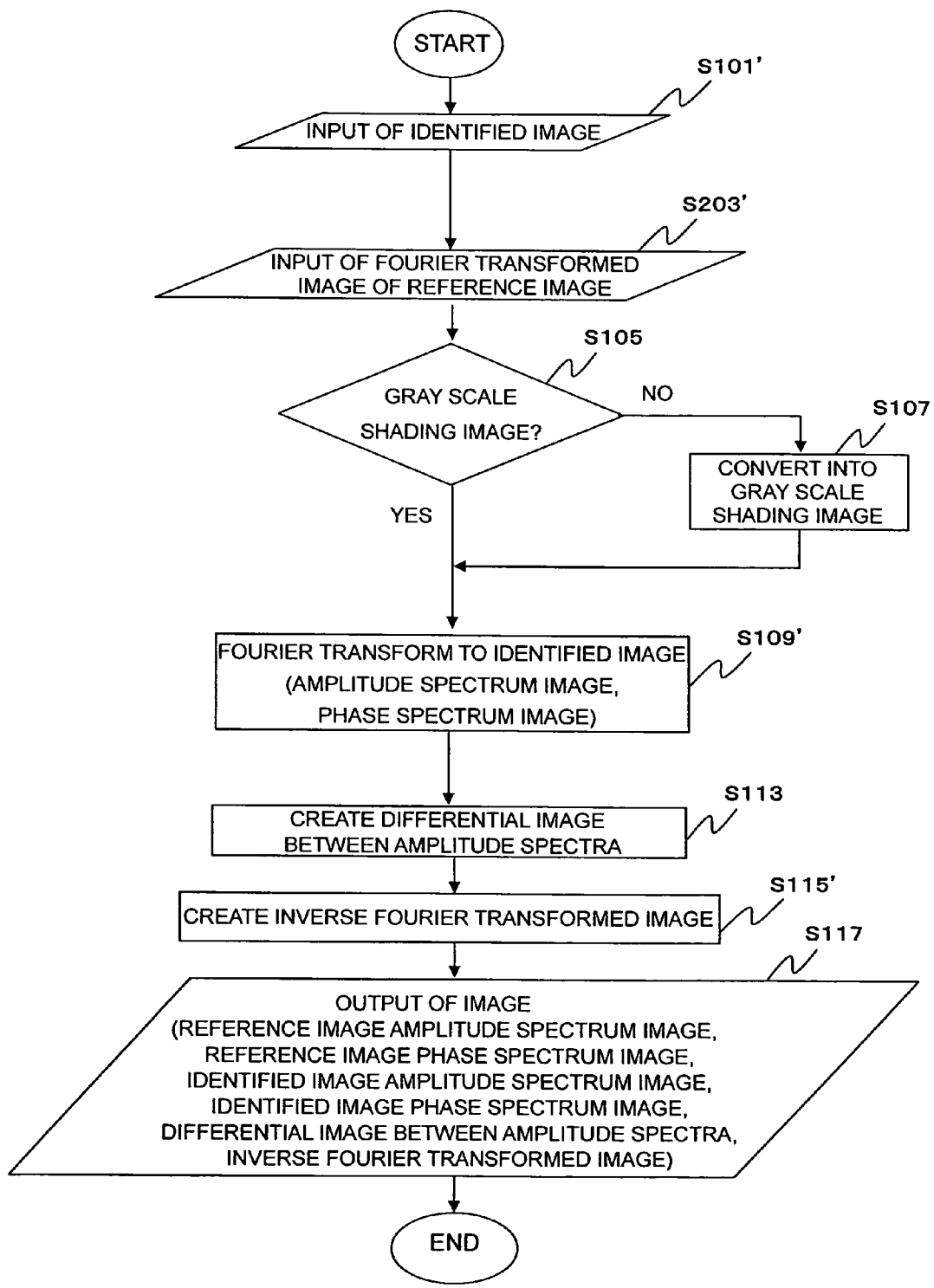
[FIG. 11] A flowchart of a modified example of the second embodiment of the method for image inspection.

(2) Modified Example (Identified Image, Fourier Transformed Image of Reference Image) of the Second Embodiment FIG. 11 is a flowchart of a modified example of the second embodiment of the method for image inspection.

The computer 3 acquires an identified image from the storage part 105 or the CCD camera 2 through the interface part 106 (S101'). The computer 3 acquires an amplitude spectrum (intensity information) of a Fourier transformed image of a reference image from the storage part 105 or the CCD camera 1 through the interface part 106 (S203').

Next, similarly to the first embodiment, the computer 3 executes a processing relating to the gray scale as the need arises (S105, 107).

The computer 3 Fourier transforms the identified image and obtains an amplitude spectrum (intensity information) and a phase spectrum (phase information) (S109').

After this, the computer executes processing steps S113, S115' and S117 similar to those of the modification of the first embodiment.

Figure 12:
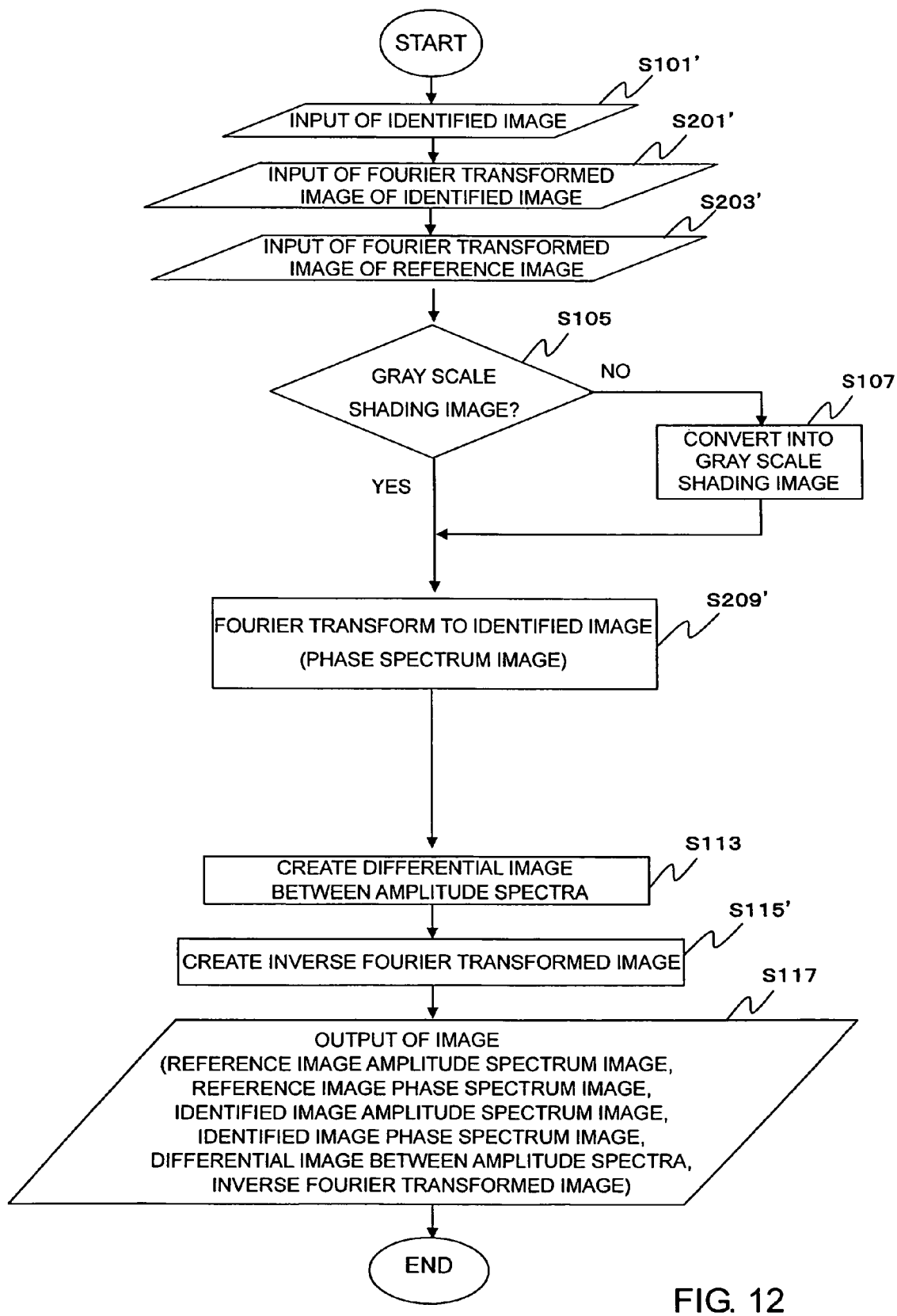
[FIG. 12] A flowchart of a modified example of the third embodiment of the method for image inspection.

(3) Modified Example (Identified Image and its Fourier Transformed Image, Fourier Transformed Image of Reference Image) of the Third Embodiment FIG. 12 is a flowchart of a modified example of the third embodiment of the method for image inspection.

The computer 3 captures an identified image from the storage part 105 or the CCD camera 2 through the interface part 106 (S101'). The computer 3 acquires an amplitude spectrum (intensity information) of a Fourier transformed image of the identified image from the storage part 105 or the CCD camera 1 through the interface part 106 (S201'). The computer 3 acquires an amplitude spectrum (intensity information) of a Fourier transformed image of a reference image from the storage part 105 or the CCD camera 1 through the interface part 106 (S203').

Next, similarly to the first embodiment, the computer 3 executes a processing relating to the gray scale as the need arises (S105, 107).

The computer 3 Fourier transforms the identified image and obtains a phase spectrum (phase information) (S209').

After this, the computer executes processing steps S113, S115' and S117 similar to those of the first embodiment.

Figure 13:
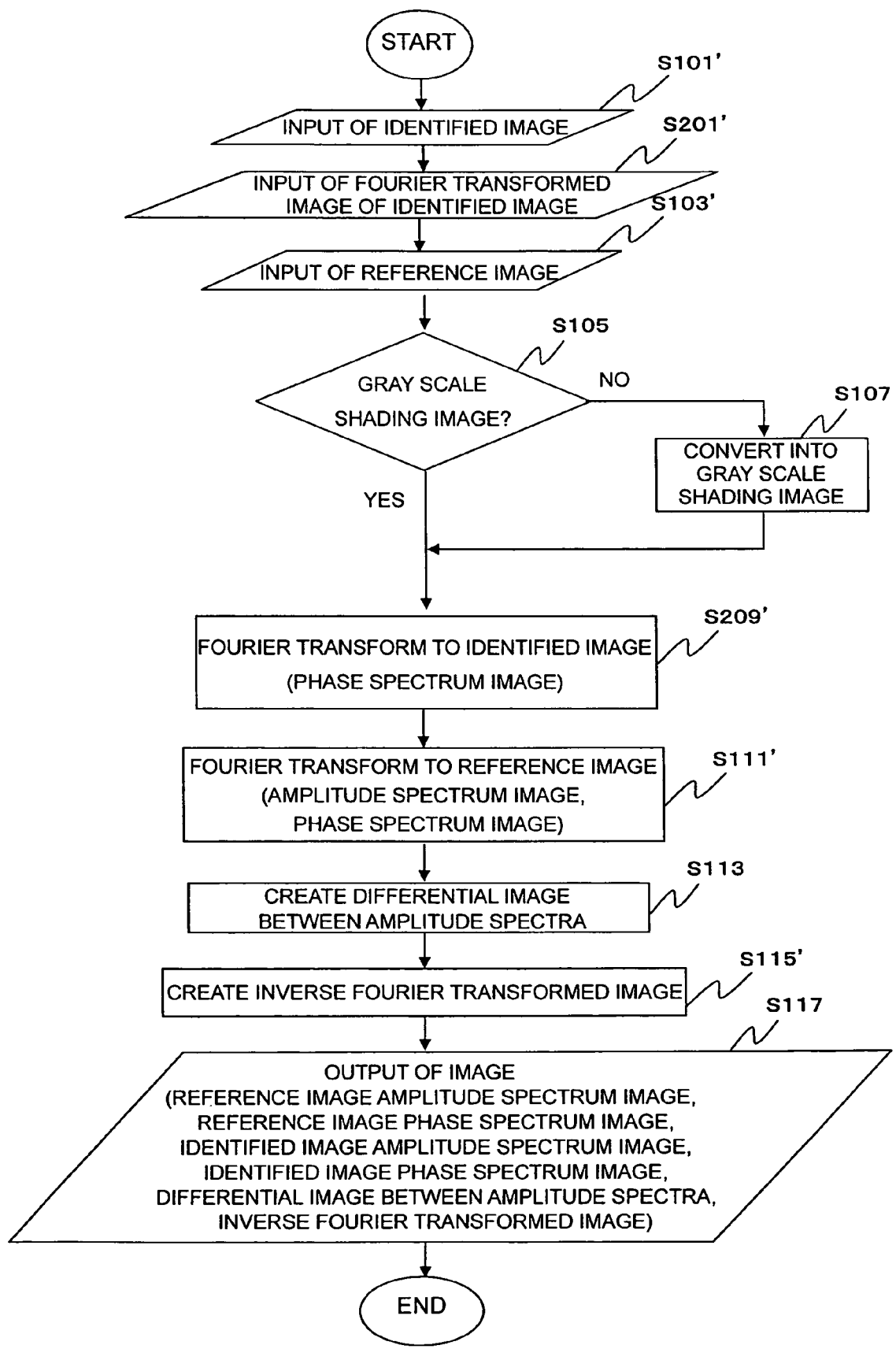
[FIG. 13] A flowchart of a modified example of the fourth embodiment of the method for image inspection.

(4) Modified Example (Identified Image and its Fourier Transformed Image, Reference Image) of the Fourth Embodiment FIG. 13 is a flowchart of a modified example of the fourth embodiment of the method for image inspection.

The computer 3 captures an identified image from the storage part 105 or the CCD camera 2 through the interface part 106 (S101'). The computer 3 acquires an amplitude spectrum (intensity information) of a Fourier transformed image of the identified image from the storage part 105 or the CCD camera 1 through the interface part 106 (S201'). The computer 3 captures a reference image from the storage part 105 or the CCD camera 2 through the interface-part 106 (S103').

Next, similarly to the first embodiment, the computer 3 executes a processing relating to the gray scale as the need arises (S105, 107).

The computer 3 Fourier transforms the identified image and obtains a phase spectrum (phase information) (S209'). Besides, the computer 3 obtains an amplitude spectrum (intensity information) of a Fourier transformed image of the reference image (S111').

After this, the computer executes processing steps S113, S115' and S117 similar to those of the modification of the first embodiment.

5. Detailed Structure (1) Acquisition Method of Fourier Transformed Image

In order to acquire an amplitude spectrum (intensity information) and a phase spectrum (phase information) of a Fourier transformed image of an image, following methods are used.

(Acquisition Method of an Amplitude Spectrum (Intensity Information) and a Phase Spectrum (Phase Information) of a Fourier Transformed Image of a Reference Image)

The computer 3 captures a reference image by a CCD camera 2 to the digital computer 3, the image is Fourier transformed by the computer 3 to be divided into an amplitude spectrum (intensity information) of the image and a phase spectrum (phase information), and they are stored in the storage part 105 of the computer.

(Method in which an Optical Diffraction Pattern of an Identified Image or a Reference Image is used as an Amplitude Spectrum of a Fourier Transformed Image)

The laser 4 irradiates a laser light to an identified image or a reference image, and the computer 3 captures a scattered light at a focal plane of a Fourier transform lens by the CCD camera 1 or the like. The computer 3 stores the captured data into the storage part 105. Incidentally, the phase spectrum used at this time is the phase spectrum of the Fourier transformed image obtained from the photographed reference image. Incidentally, when there is such a small object image in a check image that the image can not be recorded in a pixel of the CCD camera 2 unless the image is enlarged, since minute image information is enlarged in the Fourier transformed image of the reference image, it is better to use the Fourier transformed image from the beginning as the reference image. That is, a case where a defect image of several microns is compared in a large field of view applies to this case.

(2) Acquisition Method of Sharpened Image of Reference Image or Checked Image

In order to obtain a sharpened image of a reference image or a checked image and to acquire an amplitude spectrum (intensity information) and a phase spectrum (phase information) of a Fourier transformed image of the image, a following method is used. By the laser 4, desirably, an enlarged parallel laser light flux is made to pass through the ½ wavelength plate, and an oblique irradiation having a specific angle with respect to the board surface or image surface or parallel irradiation, or vertical direction irradiation is performed. The photographing of the image surface is performed by such a method that the image surface is placed at the front focal plane of the Fourier transform lens, and the reference image or the identified image is acquired at the back focal plane of the inverse Fourier transform lens having the back focal plane of the Fourier transform lens as its front focal plane. Incidentally, for the acquisition of the sharpened image of the reference image or the identified image, the relay lens system as stated above may not be used. Besides, at the photographing of the image surface, a method may be adopted in which a polarizer is placed in front of the CCD camera (electronic camera), and a sharpened image by polarizing characteristics of a scattered image is photographed in a large field of view.

Especially, with respect to an opaque board, a following method can be used.

(a) Irradiation Light Flux:

The irradiation light to the reference board or the checked board is irradiated to the object board in such a manner that the wavelength-selected laser light passes through the ½ wavelength plate to determine the angle of a polarizing plane, and is further enlarged and is made parallel, and an oblique irradiation having a specific angle with respect to the board surface or parallel irradiation, or vertical direction irradiation is performed.

(b) Photographing Position of Reference Image:

It is desirable that the reference image or the identified image is photographed at a position where the checked board passes (or set) for a check, since there does not arise a necessity to correct an image size. Another photographing position may be the back focal plane of the inverse Fourier transform lens of the relay lens system.

(c) Photographing Position and Photographing Method of Fourier Transformed Image of Checked Image:

A convex lens (Fourier transform lens) having, as the front focal plane, the board surface including the reference image or the checked image is installed, and the Fourier transformed image generated from those images on the back focal plane thereof is photographed by the CCD camera 1 as a light receiving unit with a polarizer and a wavelength filter. The polarizer and the wavelength filter are added in front of the CCD camera 1 as the light receiving unit, and the image quality is improved, and further, composition measurement of an image on the board, such as a gold plating, is enabled, and the light absorption of the surface of a specific material can be used for sharpening of an image.

Besides, with respect to a transparent board, an optical diffraction pattern of the identified image or the reference image can be used as the amplitude spectrum (intensity information) of the Fourier transformed image.

(3) Method Used for Checking of a Minute Defect or the Like in a Large Field of View A reference image is photographed by the CCD camera and is divided into an amplitude spectrum (intensity information) and a phase spectrum (phase information) of a Fourier transformed image of the image. A parallel laser light is irradiated to the checked image, the Fourier transformed image is photographed at the back focal plane of the convex lens, a difference from the former amplitude spectrum (intensity information) of the Fourier transform of the reference image is taken, and when it is combined with the phase spectrum (phase information) of the Fourier transform of the reference image to form an inverse Fourier transformed image, the image of the image differential minute defect or the like and its position are measured in a large field of view. A new technique not existing in the related art is provided in which a minute defect, a minute particle or the like on a board is instantaneously identified in a large field of view and on the whole surface of the board from the Fourier transformed pattern of the electric board or the like, and the position of the defect or the like can be specified.

(4) With Respect to Program

With respect to actual source codes, for example, the following processings may be primarily included.

A two-dimensional array is prepared, and a pixel value is written therein or is read therefrom.

A pixel value is converted from an integer (int) to a real number (double), or the inverse conversion thereof is performed.

Since an image Fourier transform result becomes a complex number, it is once represented in orthogonal form (real part and imaginary part), and that is converted into a representation in polar form (amplitude and phase).

A logarithmic processing is applied to the result of image Fourier transform.

In subtraction between images, a suitable processing is applied to pixels which have become negative numbers (all of them are not uniformly made pixel value=0).

For image data display in a frequency space, shuffling is performed in the two-dimensional array pixel data.

For storing (data output) the two-dimensional array pixel data as an image file, a file header part in bitmap format is prepared. In relation to the final resolution, it must be suitably determined each time.

The method for image inspection or the apparatus/system for image inspection of the invention can be provided through an image checking program for causing a computer to perform the respective procedures, a computer readable recording medium recording the image checking program, a program product including the image checking program and capable of being loaded into an inner memory of a computer, a computer, such as a server, including the program, or the like.

INDUSTRIAL APPLICABILITY

The invention can be applied to, for example, following methods and apparatuses.

(1) A defect checking method and apparatus of a general size image.

(2) A defect checking method and apparatus of a patterned electric board.

(3) A minute defect checking method and apparatus in the semiconductor industry.
(4) A checking apparatus of paper money/hard money
(5) A checking method and apparatus of the degree of coincidence of general images.
(6) A simple check method and apparatus of a fingerprint or the like.

The invention claimed is:

1. A method for image inspection comprising:
   capturing, by a computer, a reference image or a Fourier transformed image of the reference image from a storage part or a camera;
   capturing, by the computer, an identified image or a Fourier transformed image of the identified image from the storage part or the camera;
   obtaining, by the computer, intensity information of the Fourier transformed image of the reference image and the Fourier transformed image of the identified image, and phase information of:
   (1) the Fourier transformed image of the reference image, or
   (2) the Fourier transformed image of the identified image, or
   (3) both of the Fourier transformed image of the reference image and the Fourier transformed image of the identified image;
   taking, by the computer, a difference in intensity information between the Fourier transformed image of the reference image and the Fourier transformed image of the identified image and the result is subject to an inverse Fourier transformed image of an expression by the differential intensity information and the phase information of the Fourier transformed image of one of the reference image and the identified image;
   outputting, by the computer, the inverse Fourier transformed image to an output part or a display part; and
   extracting, by the inverse Fourier transformed image, an image defect of the identified image or a difference in image between the reference image and the identified image as a difference between the identified image and the reference image.

2. A method for image inspection according to claim 1, wherein
   the computer captures the reference image from the storage part or a second camera, and Fourier transforms the reference image to obtain the intensity information and the phase information, and
   the computer acquires the intensity information of the Fourier transformed image of the identified image from the storage part or the first camera.

3. A method for image inspection according to claim 1, wherein
   the computer captures the reference image from the storage part or a second camera, and Fourier transforms the reference image to obtain the intensity information and the phase information, and
   the computer captures the identified image from the storage part or the second camera, and obtains the intensity information of the Fourier transformed image of the identified image.

4. A method for image inspection according to claim 1, wherein
   the computer acquires the intensity information of the Fourier transformed image of the reference image from the storage part or a first camera,
   the computer captures the reference image from the storage part or a second camera, and Fourier transforms the reference image to obtain the phase information, and
   the computer acquires the intensity information of the Fourier transformed image of the identified image from the storage part or the first camera.

5. A method for image inspection according to claim 1, wherein
   the computer acquires the intensity information of the Fourier transformed image of the reference image from the storage part or a first camera,
   the computer captures the reference image from the storage part or a second camera, and Fourier transforms the reference image to obtain the phase information, and
   the computer captures the identified image from the storage part or a second camera, and obtains the intensity information of the Fourier transformed image of the identified image.

6. A method for image inspection according to claim 1, wherein
   the computer captures the identified image from the storage part or a second camera, and Fourier transforms the identified image to obtain the intensity information and the phase information, and
   the computer acquires the intensity information of the Fourier transformed image of the reference image from the storage part or a first camera.

7. A method for image inspection according to claim 1, wherein
   the computer captures the identified image from the storage part or a second camera, and Fourier transforms the identified image to obtain the intensity information and the phase information, and
   the computer captures the reference image from the storage part or the second camera, and obtains the intensity information of the Fourier transformed image of the reference image.

8. A method for image inspection according to claim 1, wherein
   the computer acquires the intensity information of the Fourier transformed image of the identified image from the storage part or a first camera,
   the computer captures the identified image from the storage part or a second camera, and Fourier transforms the identified image to obtain the phase information, and
   the computer acquires the intensity information of the Fourier transformed image of the reference image from the storage part or the first camera.

9. A method for image inspection according to claim 1, wherein
   the computer acquires the intensity information of the Fourier transformed image of the identified image from the storage part or a first camera,
   the computer captures the identified image from the storage part or a second camera, and Fourier transforms the identified image to obtain the phase information, and
   the computer captures the reference image from the storage part or the second camera, and obtains the intensity information of the Fourier transformed image of the reference image.

10. A method for image inspection according to claim 1, wherein
    a laser irradiates a parallel laser light to the identified image, and
    a first camera photographs the intensity information of the Fourier transformed image at a back focal plane of a Fourier transform lens or a convex lens.

11. A method for image inspection according to claim 1, wherein
a laser performs an oblique irradiation having a specific angle with respect to a board surface or an image surface, parallel irradiation or vertical irradiation by a parallel laser light flux which has passed through a ½ wavelength plate and in which an irradiation area is enlarged, and
with respect to photographing of the image surface, the image surface is placed at a front focal plane of a Fourier transform lens or a first convex lens, and a second camera acquires the reference image or the identified image at a back focal plane of an inverse Fourier transform lens or a second convex lens having a back focal plane of the Fourier transform lens or the first convex lens as a front focal plane.

12. A method for image inspection according claim 1, wherein
in a case where intensity information of the Fourier transformed images of the reference image and the identified image are coincident with each other, or in a case where a difference between the intensity information of those is zero or substantially zero, an information that both the images are coincident with each other is displayed on a screen.

13. A method for image inspection according to claim 1, wherein
a polarizer is placed in front of the camera, and a sharpened image caused by polarizing characteristics of a scattering image is photographed in a large field of view.

14. A method for image inspection according claim 1, wherein
a polarizer and a wavelength filter are added, and a first or a second camera photographs a light absorption of a surface of a specific material for sharpening of the image.

15. An apparatus for image inspection comprising:
a laser light source;
a camera that obtains a reference image, an identified image, or a Fourier transformed image of the reference image or the identified image;
an optical system that converts a light from the laser light source into a parallel light, irradiates it to a check object, and causes the reflected light or transmitted light from the check object to be incident on the camera; and
a computer that includes an image storage part to store a detected image and a display part or an output part to output the image, and processes the image obtained by the camera, wherein
the computer captures a reference image or a Fourier transformed image of the reference image from the storage part or the camera,
the computer captures an identified image or a Fourier transformed image of the identified image from the storage part or the camera,
the computer obtains intensity information of the Fourier transformed image of the reference image and the Fourier transformed image of the identified image, and phase information of:
(4) the Fourier transformed image of the reference image, or
(5) the Fourier transformed image of the identified image, or
(6) both of the Fourier transformed image of the reference image and the Fourier transformed image of the identified image;
the computer takes a difference in intensity information between the Fourier transformed image of the reference image and the Fourier transformed image of the identified image and the result is subject to an inverse Fourier transformed image of an expression by the differential intensity information and the phase information of the Fourier transformed image of one of the reference image and the identified image, and
the computer outputs the inverse Fourier transformed image to an output part or a display part, and extracts, by the inverse Fourier transformed image, an image defect of the identified image or a difference in image between the reference image and the identified image as a difference between the identified image and the reference image.

16. An apparatus for image inspection according to claim 15, wherein
the camera includes a second camera to obtain the reference image or the identified image, and a first camera to obtain the Fourier transformed image of the reference image or the identified image,
the computer captures the reference image from the storage part or the second camera, and Fourier transforms the reference image to obtain the intensity information and the phase information, and
the computer acquires the intensity information of the Fourier transformed image of the identified image from the storage part or the first camera.

17. An apparatus for image inspection according to claim 15, wherein
the camera includes a second camera to obtain the reference image or the identified image,
the computer captures the reference image from the storage part or the second camera, and Fourier transforms the reference image to obtain the intensity information and the phase information, and
the computer captures the identified image from the storage part or the second camera, and obtains the intensity information of the Fourier transformed image of the identified image.

18. An apparatus for image inspection according to claim 15, wherein
the camera includes a second camera to obtain the reference image or the identified image, and a first camera to obtain the Fourier transformed image of the reference image or the identified image,
the computer acquires the intensity information of the Fourier transformed image of the reference image from the storage part or the first camera,
the computer captures the reference image from the storage part or the second camera, and Fourier transforms the reference image to obtain the phase information, and
the computer acquires the intensity information of the Fourier transformed image of the identified image from the storage part or the first camera.

19. An apparatus for image inspection according to claim 15, wherein
the camera includes a second camera to obtain the reference image or the identified image, and a first camera to obtain the Fourier transformed image of the reference image or the identified image,
the computer acquires the intensity information of the Fourier transformed image of the reference image from the storage part or the first camera,
the computer captures the reference image from the storage part or the second camera, and Fourier transforms the reference image to obtain the phase information, and the computer captures the identified image from the storage part or the second camera, and obtains the intensity information of the Fourier transformed image of the identified image.

20. An apparatus for image inspection according to claim 15, wherein
the camera includes a second camera to obtain the identified image or the reference image, and a first camera to obtain the Fourier transformed image of the reference image or the identified image,
the computer captures the identified image from the storage part or the second camera, and Fourier transforms the identified image to obtain the intensity information and the phase information, and
the computer acquires the intensity information of the Fourier transformed image of the reference image from the storage part or the first camera.

21. An apparatus for image inspection according to claim 15, wherein
the camera includes a second camera to obtain the identified image or the reference image,
the computer captures the identified image from the storage part or the second camera, and Fourier transforms the identified image to obtain the intensity information and the phase information, and
the computer captures the reference image from the storage part or the second camera, and obtains the intensity information of the Fourier transformed image of the reference image.

22. An apparatus for image inspection according to claim 15, wherein
the camera includes a second camera to obtain the identified image or the reference image, and a first camera to obtain the Fourier transformed image of the identified image or the reference image,
the computer acquires the intensity information of the Fourier transformed image of the identified image from the storage part or the first camera,
the computer captures the identified image from the storage part or the second camera, and Fourier transforms the identified image to obtain the phase information, and
the computer acquires the intensity information of the Fourier transformed image of the reference image from the storage part or the first camera.

23. An apparatus for image inspection according to claim 15, wherein
the camera includes a second camera to obtain the reference image or the identified image, and a first camera to obtain the Fourier transformed image of the identified image or the reference image,
the computer acquires the intensity information of the Fourier transformed image of the identified image from the storage part or the first camera,
the computer captures the identified image from the storage part or the second camera, and Fourier transforms the identified image to obtain the phase information, and
the computer captures the reference image from the storage part or the second camera, and obtains the intensity information of the Fourier transformed image of the reference image.

* * * * *